Patented June 28, 1949

2,474,339

UNITED STATES PATENT OFFICE 2,474,339

KERATIN DERIVATIVES AND PROCESS OF PREPARATION THEREOF

Wilfred H. Ward and Charles H. Binkley, Berkeley, Calif., assignors to United States of America as represented by the Secretary of Agriculture No Drawing. Application November 22, 1946, Serial No. 711,765

17 Claims. (Cl. 252—316)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without payment to us of any royalty thereon.

This invention relates to proteins and more particularly to the treatment of keratin-containing materials to obtain new, high-molecular weight derived proteins and gels containing such materials.

In the prior art many processes are known in which keratin-containing material is treated with solvents to prepare proteinaceous products. One method (Goddard et al., J. Biol. Chem., vol. 106, p. 605, 1934) involves the reaction of the keratin-containing material with alkaline sodium sulphide. The product is precipitated from the solution so formed by adding an acid. The product so prepared is a mixture of relatively low molecular weight protein derivatives. Graenacher (Helvetica Chimica Acta, vol. 8, p. 784, 1925) treated feathers with 95% alcohol at high temperature (170° C.) under pressure. The product was water-soluble and of low-molecular weight, not giving typical tests for protein. Several other processes are cited in the articles of Jones et al., Archives of Biochemistry, vol. 2, pp. 209 to 223 (1942), and vol. 3, pp. 193 to 202 (1943). In general the prior art processes compromise between small yields and severe dispersing conditions which may lead to extensive degration; or milder conditions may be used at the expense of combination of the protein with a large amount of dispersing agent which may have to be removed in the course of further processing.

It has now been found that new proteinaceous products can be obtained from keratin-containing materials by a simple method. In general, this method involves heating a keratin-containing material, such as feathers, at a temperature from 50° C. to 150° C. with a liquid comprising water and a water-soluble aliphatic alcohol, such as ethanol, in the proportion of from 0.25 to 3.0 parts, by volume, of the alcohol, to each part, by volume, of the water. When the process is conducted at a temperature of 50° C. to about 110° C., the liquid contains, in addition to the water and alcohol in the proportions recited, about from 1 to 10 percent, based on the amount of the keratin-containing material, of a sulphur-containing, reductive type disulphide-splitting agent such as mercaptoethanol. In a large number of instances, the resulting solution when cooled forms a gel. This gel, per se, has many uses as will be explained hereinafter. The gel can be conveniently converted into the dry protein by expressing excess alcohol from the gel with a filter press. On the other hand the protein product can be recovered from the solution above the gelling temperature by precipitation with salts, acids, miscible organic solvents, or by dialysis against water. Residual alcohol, in any case, may be removed by air-drying, in the case of low-boiling alcohols, or distillation under reduced pressure if higher-boiling alcohols are present.

An object of this invention is the provision of new protein products and proteinaceous gels made from keratin-containing materials.

Another object of this invention is the provision of methods of preparing new protein products or new protein-gels from keratin-containing materials by a process involving dispersing the keratin-containing materials in an aqueous solution comprising a water-soluble alcohol.

Other objects will be apparent to those skilled in the art from the disclosure herein.

In order to describe the specific details of procedure the following examples are submitted. It is understood that these examples illustrate the procedure but are not given by way of limitation.

EXAMPLE 1

Ten grams of clean, white chicken feathers was heated 20 minutes in a water bath at 80° C. with 100 cc. of water, 100 cc. of ethanol, and 1 cc. of mercaptoethanol, as a disulphide-splitting agent, in an Erlenmeyer flask. The slurry so obtained was filtered while still hot through cheese cloth. The solution contained 35% of the feather material. Upon cooling to about 42° C., a gel was formed. This gel was dialyzed against distilled water and electrodialyzed to remove the ethanol and diffusible impurities. It was then broken up and dried in vacuo at 50° C. to yield 3.5 grams of a white solid containing 14.8% nitrogen, 2.9% sulphur, insoluble in water or dilute aqueous solutions of salts, acids, or bases but soluble in 50% aqueous ethanol at 80° C. on addition of sodium hydroxide to give a pH of 8 to 9, estimated colorimetrically. The product was found to be completely precipitated in 10% trichloracetic acid. These data establish the product as a derived protein different from the original keratin and from other derived proteins known in the prior art.

Where the further application of the product did not warrant such careful purification, the gel obtained was wrapped in a triple layer of cheese cloth and the excess ethanol expressed with a filter press—an ordinary kitchen potato ricer does well for small quantities—and the residue broken up and air-dried.

Further amounts of the protein product were obtained by repeating the water-alcohol-mercaptoethanol treatment. It was found that 3 extractions yielded a total of 6 grams of protein product.

EXAMPLE 2

A series of experiments were carried out to determine the effect of various aliphatic alcohols. In each experiment, 5 grams of chicken feathers was heated to 80° C. for 30 minutes, under reflux, with 100 cc. of a solution containing water 50% (by volume) and alcohol 50% (by volume) plus the stated amount of mercaptoethanol. The results are set forth in Table 1.

Table 1

| Experiment | Solvent | Amount of mercaptoethanol, Per Cent | Gelation point of solution, Degrees C. | Yield of protein, Per Cent |
|---|---|---|---|---|
| 1 | Methyl alcohol | 0.5 | 51 | 42 |
| 2 | Ethyl alcohol | 0.5 | 42 | 50 |
| 3 | Propanol-1 | 0.5 | 29 | 50 |
| 4 | Propanol-2 | 0.5 | 32 | 28 |
| 5 | Allyl alcohol | 0.5 | <3 | 20 |
| 6 | Propanol-1, 30%, butanol-1, 20% | 0.5 | 26 | 60 |
| 7 | Ethylene glycol | 5 | 54 | 58 |
| 8 | Propylene glycol | 5 | 36 | 54 |
| 9 | Glycerol | 5 | 69 | |
| 10 | Mercapto-ethanol | | <3 | 50 |

The gel in experiment No. 1 was loose and curdy with much exudate. The gels in experiments 2 to 4, 6, 7, and 8 were fine-grained and coherent with some exuding liquid. The gel in experiment No. 5 was slow forming, not coherent. In the case of experiment No. 9, the gel was less firm with exudate. The protein may be recovered by any of the precipitation methods mentioned heretofore.

EXAMPLE 3

A series of experiments were carried out to determine the effect of different bases on the process. In each case 10 grams of white chicken feathers was treated with 200 cc. of 40% (by volume) aqueous ethanol containing 2 cc. of mercaptoethanol, as a disulphide-splitting agent. Each sample was heated 20 minutes at 80° on a water bath under reflux. In the case of the first 5 experiments, the final concentration of the base was 0.06 N. In the case of the last three experiments, sufficient base was added in order to give a final concentration of 0.1 N. In the case of the magnesium and calcium hydroxide experiments, these bases were only partly dissolved so that the actual normality was somewhat less than 0.1 N. In each case a substantial portion of protein went into solution. It was observed that sodium hydroxide gave the highest yield of derived protein. The results are set forth in the following table:

Table 2

| Base | Yield of protein, Percent | Gel point, Deg. C. |
|---|---|---|
| Lithium hydroxide | 87 | 27 to 26.5 |
| Sodium hydroxide | 92 | 24.5 to 24 |
| Potassium hydroxide | 82 | 26 |
| Ammonium hydroxide | 79 | 37 |
| Triethanol-amine | 81 | 53 |
| Magnesium hydroxide | 70 | 41 to 40 |
| Calcium hydroxide | 74 | 39 to 38 |
| Barium hydroxide | 57 | 27 |

In the case of the lithium hydroxide experiment, the gel was transparent, slow-setting, and very firm with no syneresis. The gel obtained with sodium hydroxide was slow-setting and firm with later syneresis. The gel obtained with potassium hydroxide was opaque with syneresis. The gels obtained with ammonium hydroxide, triethanolamine, magnesium hydroxide, and calcium hydroxide were white with increasing syneresis and curdiness. In the last experiment, a flocculent precipitate was obtained.

EXAMPLE 4

Ten grams of chicken feathers was heated 20 to 40 minutes on the steam bath with a solution containing 100 cc. of ethanol and 100 cc. of 0.01 N aqueous sodium hydroxide, containing 2.5 grams of sodium sulphite, as a disulphide-splitting agent. The mixture was filtered through cheese cloth while hot. The solution gelled upon cooling. Upon drying the gel, a good yield of the novel protein product was obtained.

EXAMPLE 5

Six hundred grams of chicken feathers was placed in a glass-lined autoclave with 1600 ml. of ethanol and 1600 ml. of water. The mixture was heated and stirred for 6 hours at 125° C. The reaction mixture was discharged from the autoclave at 80° C., filtered through cloth, and the residue pressed through the cloth to remove as much liquid as possible. The solution gels at about 60° C. The gel was cooled, broken up, and dried. A yield of 510 grams of protein product was obtained. This product was found to be soluble in 50% aqueous alcohol, dilute alkali (pH 9 to 9.5) and in concentrated acetic acid.

EXAMPLE 6

Six hundred grams of chicken feathers was heated in an aluminum autoclave at 125° C. for 5 hours with 1200 ml. of propanol-1 and 2000 ml. of water. The reaction mixture was filtered through cloth at 40° C. The solution gelled at about 31° C. By drying the gel, 480 grams of the dry protein product was obtained.

EXAMPLE 7

Forty-five grams of cattle hoof powder, 110 ml. of water, and 110 ml. of ethanol were heated together in a sealed bottle at 125° C. for 6 hours in an autoclave. The reaction mixture was filtered. The filtrate, when concentrated by evaporation, was found to form a gel similar to those prepared from feathers. Upon drying the gel, about 10 grams of protein product was obtained.

EXAMPLE 8

Forty-five grams of cattle hoof ground to 40 mesh was mixed with 110 ml. of ethanol, 110 ml. of water, and sufficient sodium hydroxide to bring the slurry to a pH of 8.0. This mixture was heated in a sealed bottle at 130° C. for 4 hours in an autoclave. The resulting mixture was filtered and the liquid formed a gel. The dry product prepared by evaporation closely resembled that obtained from chicken feathers. Yield 29 grams.

EXAMPLE 9

Twenty grams of chicken feathers was heated with 60 ml. of ethyl alcohol and 160 ml. of water for 4 hours at 130° C. in a sealed bottle in an autoclave. Upon filtration a weak gel, curdy and showing syneresis, was obtained. Upon evaporation 18 grams of protein product was obtained.

EXAMPLE 10

Forty-five grams of chicken feathers was heated with 150 ml. of ethanol and 50 ml. of water at 135° C. for 3 hours in a sealed bottle in an autoclave. By filtration and evaporation 22.5 grams of dry protein product was obtained. It was found that the gel, formed upon cooling the filtrate, showed a higher gel strength than the gel of Example 5.

EXAMPLE 11

Six hundred grams of hog hair was soaked with 1800 ml. of 95% ethyl alcohol, 1800 ml. of water, and 9.0 grams of sodium hydroxide. After soaking, the colorimetric pH of this solution was about 8.5. The hair was then heated with the solution for 4 hours at 130° in a sealed vessel. The digest was cooled and filtered through a glass filter cloth. The solution was slightly alkaline with a colorimetric pH of 7.5 If it is adjusted to pH=6, the cooled filtrate forms a gel as does the derived feather protein. The filtrate was dried without adjusting the pH. The dried product weighed 320 grams, or 53⅓% of the original hair treated.

The residue from this filtration was heated at 100° C. for ½ hour with 1 liter of 95% ethyl alcohol and 1 liter of water. This was then filtered and the second filtrate was dried to yield 80 grams. Total dry powder, 400 grams, representing 66.7% of the original hair.

EXAMPLE 12

Six hundred grams of clean hog hair was soaked for 16 hours with 1800 ml. of 95% ethyl alcohol, 1800 ml. of water, and 7.2 grams of sodium hydroxide. The colorimetric pH of this solution after soaking the hair was approximately 7.8. The hog hair was then heated for 4 hours at 127° C. with the alcoholic solution in a sealed vessel. After cooling, the digest was filtered with suction through a glass filter cloth. The filtrate was then dried. The dry product is similar to the derived protein product from feathers and hoof except that it is more readily soluble in water. If the pH is adjusted to 6.0 this difference disappears and the filtrate forms a gel on cooling from a hot aqueous alcoholic solution. The dried product weighed 147 grams, representing 24.5% of the original keratin.

Essentially, the process of this invention involves heating of the keratin-containing material with a solution comprising water and a water-soluble, neutral aliphatic alcohol. Upon filtration of the reaction mixture, the protein product is present dissolved in the water-alcohol phase. The protein may be recovered in many different ways from this liquid phase. Addition of a salt (for instance, sodium sulphite, magnesium sulphate, lithium chloride, ammonium thiocyanate, etc.) will precipitate the protein. Likewise precipitation can be obtained by the addition of an acid, for example, sulphuric acid, trichloracetic acid to 10% concentration, etc. The protein can also be recovered by dialysis or electrodialysis against distilled water. In some instances, protein mineral can be recovered conveniently by pouring the hot extract into excess alcohol or excess distilled water. Another method is to cool the liquid phase, whereby a gel will form. This gel can be broken up and the alcohol and water removed by expression through a filter cloth. Residual alcohol is any case be removed from the separated derived protein by air-drying in the case of low-boiling alcohols, or by evaporation under reduced pressure if higher-boiling alcohols are present.

It has been found that the treatment of the keratin-containing material can be conducted at temperatures of from about 50° C. to 150° C. It has been observed that at the lower-temperature range (from about 50° C. to about 110° C.), it is necessary to add a small amount (1 to 10%, based on the amount of keratin-containing material) of a sulfur-containing, reductive disulphide-splitting agent such as sodium sulphite or an organic thiol compound such as mercaptoethanol (i. e., $HSCH_2CH_2OH$), thioglycolic acid or salts thereof, 1,2 dithioglycerol, etc.

It is advantageous in many instances to have a small amount of an alkaline compound present during the treatment of the keratin-containing material. Many compounds have been found to be useful in this connection, for instance, the hydroxides of sodium, potassium, lithium, calcium, magnesium, barium, etc. Likewise nitrogenous bases such as ammonium hydroxide, triethanolamine, etc. are operative. The amount of alkaline material should be only that necessary to give a slight alkaline reaction at completion of the reaction, i. e., a final pH of 7 to 9, estimated colorimetrically. When operating at the lower temperature range (50° C. to 110° C.), it has been found that a final pH of 8 to 9 gives the best results. When operating at higher temperatures under pressure, less alkaline material is necessary, i. e., only sufficient to give a final pH of 7 to 8.

The solution used to react with the keratin-containing material consists essentially of water and a water-soluble, neutral aliphatic alcohol. It has been found that many alcohols are operative in the process, namely, methanol, ethanol, propanol-1, propanol-2, allyl alcohol, ethylene glycol, propylene glycol, glycerol, mercaptoethanol, butanol-1, ethylene glycol monomethyl ether, ethylene glycol monoethyl ether, diethylene glycol monoethyl ether, ethylene glycol monobutyl ether, 2-chloroethanol, diacetone alcohol, etc.

Further, it has been found that mixtures of alcohols can be used instead of individual alcohols. Thus a mixture of propanol-1 and butanol-1 has been found to give good results.

The proportion of water to alcohol can be varied within a wide range. It is preferred to use a solution containing equal parts, by volume, of water and alcohol. However, it has been found that the aqueous solution may contain from 20% by volume to 75% by volume of the alcohol.

The proportion of treating solution to keratin-containing material may be varied within wide limits. Quantities up to 20 grams per 100 cc. of alcohol have been successfully treated. For convenience in handling with the equipment available we prefer to use this proportion for the higher temperature treatments or 5 grams to 100 cc. for the lower temperature treatments.

It has been found that a single treatment of the keratin-containing material with the solution gives good yields (60 to 90%) of the protein product. However, it is advantageous, for the purpose of obtaining a product free from lipid material and easily dispersed protein material of presumed lower molecular weight, to give the keratin-containing material a short treatment at low temperature, remove the alcohol, and then treat the residue in one of the ways described.

Many different raw materials are adapted to be treated by the instant process, namely, poultry feathers, cattle hoof, hog hoof, animal hair, animal horn, animal hide, snake skin, etc. It has been found that poultry feathers give the highest yields of protein and the product is light in color. White chicken feathers are very useful, as they give a white product in excellent yield. It has been found that the low-temperature modification (Examples 1 to 4) is very effective with feathers; with most other keratin materials only low yields of non-gelling material have been been obtained, i. e., 5–10%.

It has been observed that the treatment of the keratin-containing material should be conducted in vessels made of stainless steel, aluminum, or glass. The treatment is corrosive to iron, Monel metal, and copper, hence vessels made of these metals are not suitable for preparing a pure product.

The liquid phase obtained by filtration of the reaction mixture will gel when cooled (as described). Generally these gels range from transparent homogeneous masses to opaque granular curds. Color is generally lacking when the starting material is white or only faintly colored. These gels all have characteristic gelation points. The gelation point is determined by slowly cooling the liquid phase containing the protein. At the gelation point, the liquid becomes opaque and sooner or later thereafter sets to a firm gel. The gelation point is not critically dependent on the concentration of protein. It has been observed that the gel point is characteristic of the alcohol present. Thus the liquid obtained upon treating the keratin material with ethanol-water will gel at 42° C. However, if the alcohol is removed by filtering and pressing through cloth and the solid material dissolved in aqueous propanol-1, the gel point will be 29° C. Thus the gel point is characteristic of the alcohol present and not characteristic of the alcohol used in making the protein. Table 1 discloses the gel points with the different alcohols and, as shown above, the material from any one of these experiments when transferred to a different alcohol, has the gel point associated with the alcohol.

The protein product of the described process which contains about 15% nitrogen and about 3% sulphur, is believed to be novel. It is to be emphasized that this product is not keratin. Chemical and physical tests have shown beyond a reasonable doubt that the product is not keratin. For instance the product of this invention has been found to be completely digestible by pepsin and trypsin and soluble in 50% aqueous alcohol upon warming. Keratin is not digestible by pepsin nor by trypsin nor is it soluble in warm aqueous alcohol.

It has been determined that the product of this invention is substantially different from the material prepared by alkaline-sulphide extraction of keratin (Goddard et al., cited above). The product of the instant process can be molded without addition of any plasticizer and will show true flow under high temperature and pressure in standard Rossi-Peaks flow-testing equipment. Under the same conditions, the material prepared by the alkaline-sulphide process will flow only to a negligible extent. The test mentioned above is a standard technique used in industry for the characterization of low and high molecular synthetic rubbers. It has also been observed that a solution of the product of this invention in alcohol will, upon standing, form a skin film on the surface thereof. This is an indication of the high molecular weight of the product. The products made by dispersing keratin in such reagents as sodium sulphide are of low molecular weight because of degradation of the keratin molecule.

Other tests have demonstrated that the instant protein product is different from keratin and from keratin derivatives produced by prior art methods. Thus natural keratins such as hoof, horn, feathers, etc., exhibit negligible plastic flow even with large amounts of protein plasticizer. The keratin derivative made from feathers by extraction with 0.1 M sodium sulphide (Jones, Archives of Biochemistry, vol. 2, pp. 209–223) has considerably more flow than the natural keratins but does not have enough to be of practical value, being about 3 to 4 times greater than natural keratins but only one-sixth that of rennet casein (using 20% of 3-sulpholanol as plasticizer). The product of the instant process, made by treating feathers with 50% aqueous ethanol and 2% mercaptoethanol for ½ hour on the steam bath, exhibits about 2 times as much flow as rennet casein, using 20% of 3-sulpholanol in each case as a plasticizer.

The protein product of this invention has many uses. The dry protein product may be added to poultry and livestock feeds to provide additional protein nutrient material needed by the organism. The protein can be molded upon application of heat and pressure, without requiring additional plasticizer, to form a horny material resembling keratin in physical properties and solubility. Thus many types of articles such as fountain pen barrels, ashtrays, serving trays, container closures, buttons, electrical equipment, etc. can be fabricated from the protein product. Sizes can be readily prepared by dissolving the protein in aqueous alkali or the liquid phase obtained after filtration may be used directly as a size or adhesive. The product can also be used as a microbiological growth medium. The products can be used as extenders for thermosetting resins and as setting retardants for plaster of Paris, etc.

The gels disclosed herein can be used for hectograph bases. Preferably a small amount of glycerin should be added and the resulting gel can be used as a hectograph or for the preparation of printing rolls or blankets. Further, the gels can be considered as a convenient source of the protein as they are easily dissolved in many solvents.

The reacted protein materials may also be used without separation of their non-dissolved portions. Thus the product may be dried without any separation except the removal of water and alcohol and the dried material used as a feed component or as a component of molding resins.

Having thus described our invention, we claim:

1. A process for preparing proteinaceous products which comprises heating a keratin-containing material at a temperature from 50° to 150° C. with a liquid comprising water and a water-soluble aliphatic alcohol in the proportion of from 0.25 to 3.0 parts by volume of the alcohol to each part by volume of water, said liquid containing, in addition to the water and alcohol in the proportions recited, about from 1 to 10 percent, based on the amount of said keratin-containing material, of a sulphur-containing, reductive disulphide-splitting agent when the process is conducted at a temperature of 50° C. to about 110° C.

2. A process for preparing proteinaceous products which comprises heating a keratin-containing material at a temperature from 50° to 150° C. with a liquid comprising ethanol and water in the proportion of from 0.25 to 3 parts by volume of ethanol to each part by volume of water, said liquid containing, in addition to the water and ethanol in the proportion recited, about from 1 to 10 percent, based on the amount of said keratin-containing material, of a sulphur-containing, reductive disulphide-splitting agent when the process is conducted at a temperature of 50° C. to about 110° C.

3. A process for preparing proteinaceous products which comprises heating feathers at a temperature from 50° to 150° C. with a liquid comprising ethanol and water in the proportion of from 0.25 to 3 parts by volume of ethanol to each part by volume of water, said liquid containing, in addition to the water and ethanol in the proportions recited, about from 1 to 10 percent, based on the amount of said feathers, of a sulphur-containing, reductive disulphide-splitting agent when the process is conducted at a temperature of 50° C. to about 110° C.

4. A process for preparing proteinaceous products which comprises heating a keratin-containing material at a temperature from 50° to 150° C. with a liquid comprising water, a water-soluble aliphatic alcohol, and sufficient base to give a final pH of 7 to 9, wherein the proportion of the alcohol to water is from 0.25 to 3 parts, by volume, of the alcohol to each part, by volume, of water, said liquid containing, in addition to the base, water, and alcohol, in the proportion recited, about from 1 to 10 percent, based on the amount of said keratin-containing material, of a sulphur-containing, reductive disulphide-splitting agent when the process is conducted at a temperature of 50° C. to about 110° C.

5. A process for preparing proteinaceous products which comprises heating a keratin-containing material at a temperature from 50° to 150° C. with a liquid comprising water, ethanol, and sufficient base to give a final pH of 7 to 9, wherein the proportion of ethanol to water is from 0.25 to 3 parts by volume of ethanol to each part by volume of water, said liquid containing, in addition to the base, water, and ethanol in the proportion recited, about from 1 to 10 percent, based on the amount of said keratin-containing material, of a sulphur-containing, reductive disulphide-splitting agent when the process is conducted at a temperature of 50° C. to about 110° C.

6. A process for preparing proteinaceous products which comprises heating feathers at a temperature of from 50° to 150° C. with a liquid comprising water, ethanol, and sufficient alkali to give a final pH of 7 to 9, wherein the proportion of etahnol to water is from 0.25 to 3 parts by volume of ethanol to each part by volume of water, said liquid containing, in addition to the alkali, water, and ethanol in the proportion recited, about from 1 to 10 percent, based on the amount of said feathers, of a sulphur-containing, reductive disulphide-splitting agent when the process is conducted at a temperature of 50° C. to about 110° C.

7. A process for preparing proteinaceous products which comprises heating feathers at a temperature of 50° C. to about 110° C. with a liquid comprising water, a water-soluble aliphatic alcohol, about from 1 to 10 percent, based on the amount of the feathers, of a sulphur-containing, reductive disulphide-splitting agent, and sufficient base to give a final pH of 8 to 9, wherein the proportion of the alcohol to water is from 0.25 to 3 parts, by volume, of the alcohol for each part, by volume, of water.

8. A process of preparing proteinaceous products which comprises heating feathers at a temperature of 50° C. to about 110° C. with a liquid comprising water, a water-soluble aliphatic alcohol, and about from 1 to 10 percent, based on the amount of the feathers, of a sulphur-containing, reductive disulphide-splitting agent, wherein the proportion of the alcohol to water is from 0.25 to 3 parts, by volume, of the alcohol to each part, by volume, of water.

9. A process of preparing proteinaceous products which comprises heating feathers at a temperature of 50° to about 110° C. with a liquid comprising water, a water-soluble aliphatic alcohol, and about from 1 to 10 percent, based on the amount of the feathers, of mercaptoethanol, wherein the proportion of the alcohol to water is from 0.25 to 3 parts, by volume, of the alcohol to each part, by volume, of water.

10. A process for preparing proteinaceous products which comprises heating feathers at a temperature of 50° C. to about 110° C. with a liquid comprising approximately equal parts of ethanol and water and about 1 percent of mercaptoethanol, based on the amount of feathers.

11. A process for preparing proteinaceous products which comprises heating a keratin-containing material under autogenous pressure at a temperature of 100° C. to 150° C. with a liquid comprising a water-soluble aliphatic alcohol and water in the proportions of 0.25 to 3 parts, by volume, of the alcohol to each part, by volume, of water.

12. A process for preparing proteinaceous products which comprises heating a keratin-containing material under autogenous pressure at a temperature of 100° C. to 150° C. with a liquid comprising ethanol and water in the proportions of 0.25 to 3 parts, by volume, of ethanol to each part, by volume, of water.

13. A process for preparing proteinaceous products which comprises heating a keratin-containing material under autogenous pressure at a temperature of 100° C. to 150° C. with a liquid comprising ethanol and water in approximately equal proportions.

14. A process for preparing proteinaceous products which comprises heating a keratin-containing material at a temperature from 50° C. to 150° C. with a liquid comprising a water-soluble aliphatic alcohol and water in the proportion of 0.25 to 3 parts, by volume, of the alcohol to each part, by volume, of water, said liquid containing, in addition to the water and alcohol in the proportion recited, about from 1 to 10 percent, based on the amount of said keratin-containing material, of a sulphur-containing, reductive disulphide-splitting agent when the process is conducted at a temperature of 50° C. to about 110° C., filtering the reaction product, and cooling the filtrate to form a gel.

15. A process for preparing proteinaceous products which comprises heating a keratin-containing material at a temperature from 50° C. to 150° C. with a liquid comprising a water-soluble aliphatic alcohol and water in the proportion of 0.25 to 3 parts, by volume, of the alcohol to each part, by volume, of water, said liquid containing, in addition to the water and alcohol in the proportion recited, about from 1 to 10 percent, based on the amount of said keratin-containing material, of a sulphur-containing, reductive disulphide-splitting agent when the process is conducted at a temperature of 50° C. to about 110° C., filtering the reaction product, and separating the proteinaceous product from the filtrate.

16. A gel comprising a water-soluble aliphatic alcohol, water, and a high molecular weight keratinaceous product, the alcohol and water being present in the proportion of from 0.25 to 3 parts, by volume, of the alcohol to each part, by volume, of water, said keratinaceous product containing about 15 percent nitrogen and about 3 percent sulphur, being digestible by pepsin and trypsin, showing true flow under high pressure and temperature, being insoluble in water and in dilute aqueous acids and salts, and being soluble in warm 50 percent aqueous ethanol to form a solution which gels upon cooling.

17. The gel of claim 16 wherein the water-soluble aliphatic alcohol is ethanol.

WILFRED H. WARD.
CHARLES H. BINKLEY.

REFERENCES CITED

The following references are of record in the file of this patent:

UNITED STATES PATENTS

| Number | Name | Date |
| --- | --- | --- |
| 2,007,633 | Bornhauser | July 9, 1935 |

OTHER REFERENCES

Goddard et al.: J. Biol. Chem., 106, pages 610 and 611 (1934); ibid., 112, pages 364–369 (1935).

Jones et al.: Archives of Biochemistry, 3, pages 193–201, No. 2, December 1943.

Edwards et al.: J. Biol. Chem., 154, pages 593–596 (1944).

Industrial and Engineering Chemistry, 36, pages 1150 and 1151, No. 12, December 1944.

Lundgren: Textile Research Journal, 15, pages 350–353, October 1945.

Fraenkel-Conrat et al.: J. Biol. Chem., 161, pages 259–268, November 1945.